United States Patent

Stobbe

[19]

[11] Patent Number: 6,104,285
[45] Date of Patent: Aug. 15, 2000

[54] ANTI-THEFT SECURITY SYSTEM AND A PROCESS FOR THE AUTOMATIC DETECTION AND IDENTIFICATION OF MERCHANDISE SECURITY LABELS

[76] Inventor: Anatoli Stobbe, Steinradweg 3, D-30890 Barsinghausen, Germany

[21] Appl. No.: 09/174,529

[22] Filed: Oct. 16, 1998

[30] Foreign Application Priority Data

Oct. 17, 1997 [DE] Germany ............................ 197 45 953

[51] Int. Cl.[7] .................................................. G08B 26/00
[52] U.S. Cl. ...................... 340/505; 340/568.1; 340/571; 340/572.1; 340/572.5
[58] Field of Search .............................. 340/568.1, 568.7, 340/571, 572.1, 572.5, 572.7, 573.1, 573.4

[56] References Cited

U.S. PATENT DOCUMENTS

| | | | |
|---|---|---|---|
| 3,689,885 | 9/1972 | Kaplan et al. ...................... | 340/825.34 |
| 3,914,762 | 10/1975 | Klensch .............................. | 340/825.54 |
| 4,658,263 | 4/1987 | Urbanski .................................. | 343/788 |
| 4,818,885 | 4/1989 | Mongeon et al. .................. | 340/825.54 |
| 4,924,171 | 5/1990 | Baba et al. .............................. | 323/347 |
| 5,028,918 | 7/1991 | Giles et al. ......................... | 340/825.54 |
| 5,264,829 | 11/1993 | Paul et al. ............................ | 235/462.46 |
| 5,491,468 | 2/1996 | Everett et al. ............................ | 340/572 |
| 5,640,002 | 6/1997 | Ames et al. .......................... | 340/572.4 |
| 5,686,513 | 8/1987 | Farrar et al. ............................... | 524/83 |
| 5,838,235 | 11/1998 | Thorigne ............................. | 340/572.1 |

FOREIGN PATENT DOCUMENTS

| | | |
|---|---|---|
| 0 020 062 | 12/1980 | European Pat. Off. . |
| 0 262 994 | 4/1988 | European Pat. Off. . |
| 0 449 173 | 10/1991 | European Pat. Off. . |
| 0 663 657A1 | 7/1995 | European Pat. Off. . |
| 0 798 681 | 10/1997 | European Pat. Off. . |
| 3231595C2 | 3/1983 | Germany . |
| 3624285A1 | 2/1987 | Germany . |
| 3700101a1 | 8/1987 | Germany . |

*Primary Examiner*—Daryl C. Pope
*Attorney, Agent, or Firm*—Collard & Roe, P.C.

[57] ABSTRACT

A anti-theft security system and process for securing merchandise. The security system comprises a base station that has a low frequency (LF) stage having a LF receiving and transmitting unit attached to the base station. Attached to the LF stage is an antenna for generating an electromagnetic field. In addition a plurality of merchandise security labels are each attached to a piece of merchandise. Each security label comprises a LF stage having a LF transmitter and receiving unit operating on the same frequency as the base station LF stage. When a security label enters the field transmission region of the base station the base station a bidirectional signal transmission takes place between the base station and at least one of the security label transponders. If the base station detects an active LF stage on the one of the security labels then an alarm will sound. The process for securing this merchandise includes the steps of transmitting a control signal of the same frequency from a LP stage of the base station to a LF stage on a transponder and back. In addition, the base station transmits a receive confirmation signal to the transponder and the transponder sends this signal back again. Finally check mechanisms are integrated into the transmission sequence so that an alarm is triggered if the defined criteria are not maintained or satisfied.

18 Claims, 5 Drawing Sheets

EB-Signal: receive confirmation signal

ANTI-THEFT SECURITY SYSTEM AND A PROCESS FOR THE AUTOMATIC DETECTION AND IDENTIFICATION OF MERCHANDISE SECURITY LABELS

BACKGROUND OF THE INVENTION

1. Field of the Invention

This invention relates to the field of theft security or anti-theft systems for merchandise. More particularly, this invention relates to an anti-theft security system that comprises a base station that generates an electromagnetic field that is in contact with one or more security labels attached to merchandise. In addition, the invention concerns a process for the automatic detection and identification of a merchandise security label by a base station so that when merchandise with the security label enters the electromagnetic field an alarm will sound alerting others to the theft of the merchandise.

2. The Prior Art

Electric security systems are employed in department stores for the purpose of better protecting high-priced merchandise against theft. A base station is located for this purpose at the exit of these department stores. These base stations generate an electromagnetic field covering the area of the exit. Merchandise security labels are attached to the goods to be protected. After a piece of merchandise has been properly paid for, the security label is either removed or destroyed at the cash register. When a person with the paid merchandise passes through the electromagnetic field located at the exit of the department store, the base station does not react. However, if a person wishes to pass the electromagnetic field with merchandise still having a functioning security label attached to it, then this security label is detected by the base station, whereupon an alarm is triggered.

Security labels that generate an electromagnetic response signal from the energy absorption of a signal sent from a base station are known in the art. Such an anti-theft security system is described, for example in EP 0 663 657 A1. A system operating with energy absorption employs an oscillating circuit in the security label, with this circuit being formed by a coil and a capacitor. This oscillating circuit generates a second magnetic alternating field when entering into the electromagnetic field of the base station. These second magnetic alternating fields can be detected via an antenna. Such systems usually operate in the HF-range from 1 to 2 MHz.

Other systems are known in which a ferromagnetic material is used as the security label, and where the base station operates in the manner of a metal detection device. With this device, an electromagnetic field is generated by the base station, and influenced by interferences caused by the ferromagnetic element, whereupon such an element is detectable.

Even though a great number of thefts can be prevented with this known anti-theft security system, it is possible to "outwit" such a system by screening the security label from the electromagnetic field generated by the base station before passing through the electromagnetic field. A piece of merchandise can be screened by wrapping the entire piece with the security label in aluminum foil or other metallic foil materials. If larger pieces of merchandise are involved, an aluminum suitcase could be used to outwit the system. In this case, if the electromagnetic field generated by the base station is not influenced, no response signal is received by the base station, and thus, no alarm is triggered.

These known systems also pose problems in situations where several of these security labels enter in the base stations's field of detection at once. In this case, the base station, which is in the alarm position, is then blocked by the first security label, and subsequent security labels entering the range of detection of the base station can then pass the latter unnoticed. A security label hidden within the range of such a base station can permanently put the entire installation out of operation.

Based on the state of the art discussed above the invention is therefore based on overcoming prior art by providing an anti-theft security system that is more reliable and less sensitive to manipulation.

SUMMARY OF THE INVENTION

The purpose of the invention is to make available a process for the automatic detection and identification of one or a plurality of merchandise security labels by a base station. This system should be relatively more sensitive and therefore less likely to be manipulated.

Thus, the invention overcomes the limitations of the prior art by providing a low-frequency (LF)-stage with a LF-transmitting-and-receiving unit. Therefore, when the security labels cooperate with the base station, each comprise an active transponder having a LF-stage with a LF-transmitting-and-receiving unit. When these two units operate on the same frequency, a bidirectional signal transmission can be carried out between the base station and a transponder.

The invention overcomes the limitations of the prior art by providing a process for the automatic detection and identification of a merchandise security label by a base station. This process provides two LF-stages, whereby one LF-stage with a LF-transmitting-and-receiving unit is associated with the base station, and another LF-stage with a LF-transmitting-and-receiving unit is associated with an active transponder. This process comprises the following steps:

Transmitting a low-frequency control signal from the LF-stage of the base station.

Receiving the control signal in the LF-stage of the transponder.

Transmitting a response signal from a transmitter associated with the transponder.

Receiving the response signal in the receiving unit of the base station operating on the same frequency.

Transmitting a receive confirmation signal from the base station; and

Receiving the receive confirmation signal in the transponder.

In this case, when a non-release signal is received by the transponder or when no confirmation signal is received upon repeated transmission of the response signal, the transponder triggers an alarm on the LF-line.

In addition, prior to, or in the course of signal transmission by the base station, an occupancy (or busy) check takes place with respect to any foreign occupancy of the line used for receiving the response signal Furthermore, an occupancy or busy message is issued if the line is found to be occupied externally.

Since a LF-stage with a LF-transmitting-and-receiving unit is associated with both the base station and the security label, these LF-stages operate in the low-frequency range, whereby data transmission is carried out in the 5 to 100 KHZ frequency range. In this case, a system is created with a signal transmission that cannot be easily screened due to the selected frequency. Thus, the electromagnetic field generated by the base station's LF-stage is preferably a cyclic or pulsed field, and in connection with this field, the base station also transmits a control signal. The security label has a LF-stage with a LF-transmitting-and-receiving unit as well. In this case, an active security label is created in the form of a transponder, so that bidirectional signal transmission (data transmission) is possible between the base station and a security label in the form of a transponder. The bidirectional data transmission can be used to perform several authorizations or validity checks, so that an alarm can be triggered and this step can be coupled to different check steps. Thus, there is a great reduction in the triggering of false alarms.

The invention therefore comprises a check mechanism so that the base station checks whether the frequency range selected for receiving the response signal is available. If the channel is occupied by an interfering transmitter, a system alarm is triggered accordingly as an occupancy message.

To provide greater transmission checks, the LF-stage of the base station transmits a receive confirmation signal after receiving a response signal transmitted by the transponder. This receive confirmation signal may be encoded as a release signal acknowledging successful completion of the bidirectional data transmission. On the system side, this type of transponder, with the merchandise attached to it, is then authorized to leave the secured location of the merchandise. A non-release signal can be transmitted as a receive confirmation signal as well. This type of a non-release signal can represent—occupancy of the base station unit receiving the response signals within the framework of anti-collision monitoring by the base station. Or it can cause the transponder to retransmit the response signal, or such signal may be another control command.

One advantage of the invention is to provide a LF-stage on the base station that transmits a control signal in the form of a prompting signal. Within the scope of the discription of the invention the term "prompt" or "prompting signal" is used in the sense of waking-up or wake-up-signal respectively, with which signal certain electronic circuits ire brought from a sleep mode into a working mode. This signal is received by the LF-receiver of the transponder. The transmitter of the transponder is then intended to transmit the response signal. This measure permits a long battery life because the transponder consumes only very little current in the silent operation or sleep mode. The transmitter intended to transmit the response signal of the transponder may be the LE-transmitter of the LF-stage. The benefits gained when using an LP-transmitter for transmitting signals are very difficult to screen. In this case, the base station can receive a response signal even if the transponder is wrapped in aluminum foil or other metallic foil materials.

Due to bidirectional signal or data transmission, this type of a system can be employed not only as an anti-theft security system, but also as the response signal transmitted by the transponder. This signal may contain additional information concerning the identity of the merchandise as well. In this case, the response signals received by the base station can then be supplied to a merchandise management system.

This transponder detection and identification has to take place in a very short time, especially in anti-collision operation with a plurality of transponders. This detection means the rate of data transmission on the LF-line is limited.

Therefore, an additional embodiment can comprise a HF-stage comprising a HF-transmitter that is associated with the transponder contained in the security label. In addition, there is a corresponding HF-stage operating on the same frequency and having a HF-receiver that is associated with the base station. On a HF-line, for example 400 MHz, data transmission is a multiple higher within the same time unit. It is useful if the HF-stage is coupled to the LF-stage of the transponder so that the HF-stage is prompted when it receives the control or prompting signal. The invention is designed so that only the transponder response signal is transmitted on the HF-line. On the other hand, the receive confirmation signal transmitted upon this type reception by the base station is transmitted on the LF-line to overcome manipulating screenings.

Because the base station is operated not by batteries but by the A-C electric main, the base station's LF-stage transmitting power is a multiple higher than the transmitting power of the LF-stage of the transponder. Therefore, a receive confirmation signal transmitted on the LF-line is capable of penetrating even screens. If such a security label is screened with respect to the HF-line, the LF-stage of the base station will not transmit a receive confirmation signal because no response signal of the transponder has been received by the HF-receiver. If the transponder's LF-stage does not receive a confirmation signal, in spite of repeated transmission of the response signal, the transponder's LF-transmitter unit is used for transmitting an alarm signal on the LF-line. This alarm signal is received by the base station, whereupon an alarm is triggered.

As an alarm, the base station may actuate a sound and/or optical (visual) alarm, for example a siren. However, as an alarm, it is also possible to transmit an alarm signal on the LF-line instead. This alarm signal contains a control command for putting the transponder into alarm operation. The alarm triggered in the transponder may also be of a visual or sound nature, so that the transponder that is put into an alarm operation is detectable by the security personnel.

In a further development, the transponder's HF-stage is connected to an antenna detuning device. The antenna detuning is caused by screening which is carried out when mistuning of the antenna is detected. In this case, an antenna deposited on metal that is tuned to air is usually mistuned.

For the security system to work efficiently, there must be a bidirectional dialogue between the base station and a transponder after a response signal has been transmitted or received. Therefore, the transponder and the base station each have a HF-stage comprising a HF-transmitting-and-receiving unit. With this type of an embodiment of the invention, it is possible to exchange greater amounts of data between the base station and the transponder within a very short time. Therefore there is greater security against manipulations on the air line.

To further increase the security, an alarm signal receiver is connected to the base station. The alarm signal receiver's receiving range is disposed substantially outside of the active range of the base station. In this way, if the base station's line is occupied by a response signal, and the transponder is occupied by a corresponding interference signal, the transponder can switch to an alarm position. Once the transponder is in an alarm position, it can transmit an alarm signal, so that it can be received by the undisturbed alarm signal receiver. Upon reception of this signal, the alarm signal receiver then triggers a system alarm, and thus corresponds with a system alarm triggered by the base station.

When transponders are used, the alarm signal can transmit an identical data structure that contains the same data. Furthermore, the prompting or control signal, transmitted by the base station on the LF-line, can be used as a synchronizing signal to synchronize the transmission of alarm signals of a plurality of transponders in time. The alarm signal can be recognized by the base station with such a design, even if several transponders are in alarm operation.

One great advantage of this system is that if the anti-theft security system is additionally operated with an anti-collision process, then a multitude of transponders are detected and identified by the base station in a controlled manner and are capable of communicating with the base station. With such an anti-collision process, it is possible for a person to be equipped with a personal transponder that enters the active range of the base station together with various objects fitted with corresponding security labels. In this way, all transponders can be detected and identified during their presence in this range The base station can then carry out a corresponding association and authorization check of the objects carried by such person.

Therefore, it is an object of the invention to provide a high security alarm system that is relatively secure against manipulation.

It is another object of the invention to provide a highly reliable security system for preventing the theft of merchandise.

It is still a further object of the invention to provide a security system that is simple in design, inexpensive to manufacture and easy to install.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
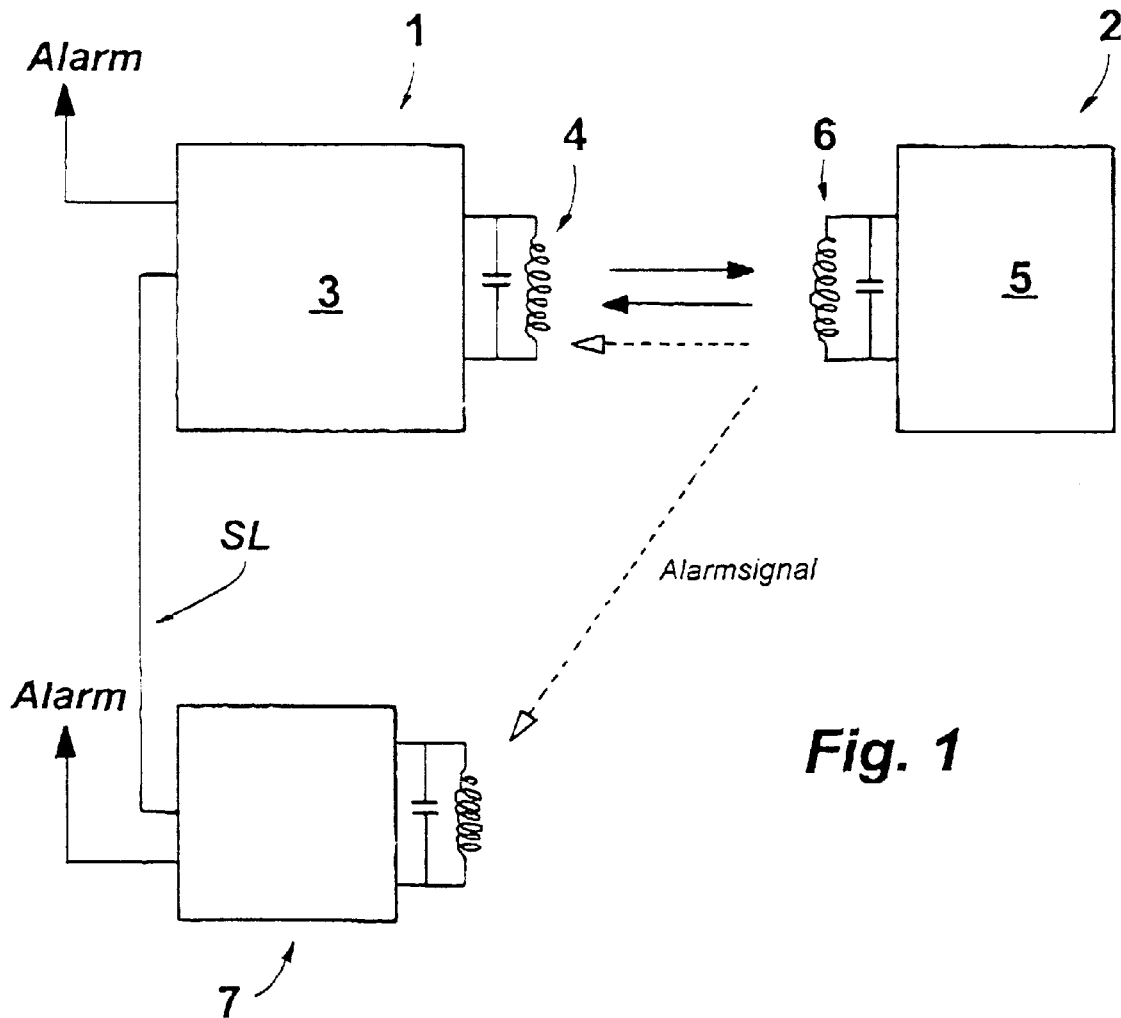
FIG. 1 is an electrical block diagram of the circuit of a anti-theft security system for securing merchandise.

Turning now in detail to the drawings, FIG. 1 shows a anti-theft security system for securing merchandise that comprises a base station 1 and a large number of transponders, of which a transponder 2 is shown in FIG. 1. Transponder 2 is contained in a merchandise security label not shown, which is attached to the safeguarded merchandise not shown. Base station 1 is installed in a location's exit area where merchandise is secured, such as a department store. The exit area is positioned in such a way so that the merchandise leaving the store with the security label has to pass through the active range of base station 1.

Base station 1 has a Low Frequency (LF)-stage 3, which consists of both a transmitting unit and a receiving unit. An antenna 4 is attached to LF-stage 3. Signals to be transmitted on the LF-line and data to be received on the LF-line can be transmitted and received by means of antenna 4. Transponder 2 also comprises a LF-stage 5 which consists of a transmitting unit and a receiving unit. These transmitting and receiving units are commonly using LF-antenna 6.

Both modules, i.e., base station 1 and transponder 2 each comprise a processor unit. Additional components such as an alarm system can act upon these processor units.

Figure 1A:
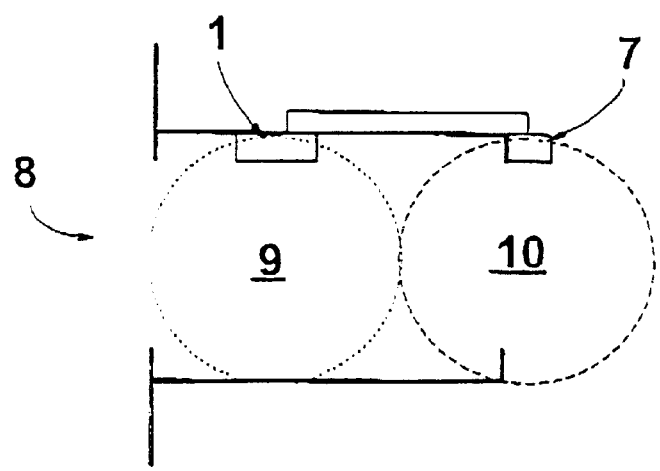
FIG. 1a is a schematic top view of the circuit arrangement of the anti-theft security system according to FIG. 1.

FIG. 1a shows the arrangement of an anti-theft security system consisting of base station 1 and an additional alarm signal receiver 7. The anti-theft security system is arranged in the area of exit 8 of the department store not shown in detail. Active range 9 of base station 1 is shown framed by a short dotted line and represents the region where a transponder 2 is capable of receiving a prompting signal transmitted by base station 1. An alarm signal receiver 7 is arranged outside of active range 9. Reception range 10 of signal receiver 7 is shown by a line. Alarm signal receiver 7 can be located at the exit of a porch, or landing through which persons using exit 8 have to pass.

Base station 1 and alarm signal receiver 7 are connected to each other by a synchronizing line SL. Synchronization of the transmitting operation of base station 1 and the receiving operation of alarm signal receiver 7, takes place via the synchronizing line SL. This synchronization is designed in such a way that LF-stage 3 of base station 1 cyclically transmits the prompting signal controls to the reception standby of alarm signal receiver 7 anti-cyclically. Alarm signal receiver 7 can then receive an alarm signal transmitted on the LF-line if no prompting signal is transmitted by LF-stage 3. Base station 1 and alarm signal receiver 7 are thus prevented from influencing each other In addition, base station 1 transmits a control or prompting signal so that, alarm signal receiver 7 is switched silent using attenuators. In this way, one can prevent any influencing of alarm signal receiver 7 by the transmission of the prompting signal of LF-stage 3.

Figure 2:
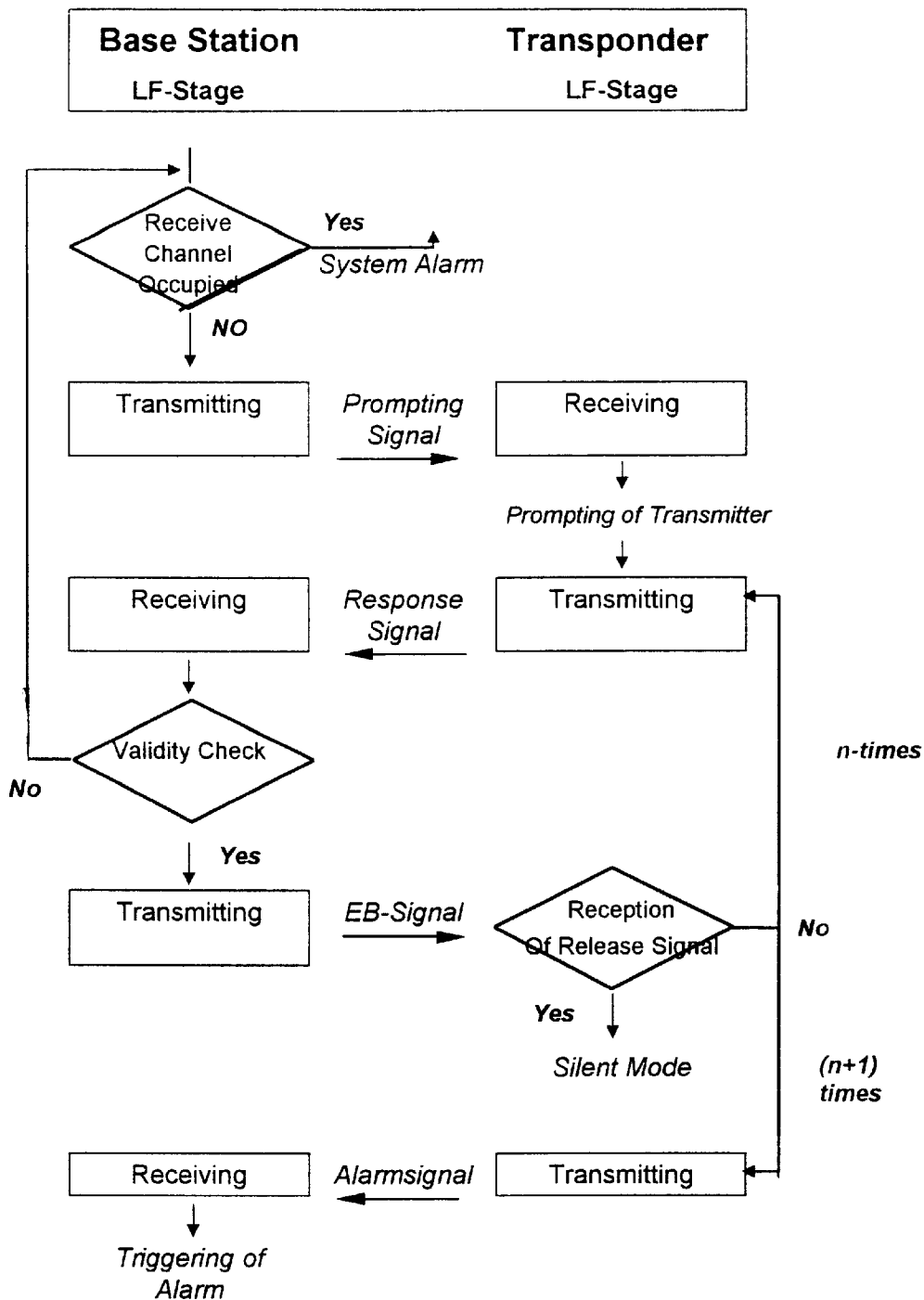
FIG. 2 is a schematic flow diagram for the detection and identification of a merchandise security label by a base station with the anti-theft security system shown in FIG. 1.

FIG. 2 shows the operation of this anti-theft security system. In a first step, base station 1 of FIG. 1 checks whether the receive channel on the LF-line is occupied. If the channel is occupied, base station 1 triggers a system alarm. If base station 1 operates with an anti-collision algorithm, and if the receiver channel is occupied, LF-stage 3 transmit s a wait signal through communication with another transponder 2. If the receive channel is free, or available, LF-stage 3 transmits a prompting signal on the LF-line which is encoded, when an anti-collision process is employed. This prompting signal is received by a transponder 2 located in the active range of base station 1 with its LF-stage 6. The received prompting signal leads to the prompting of LF-transmitter 5. In this way, transmitter 5 is in operation only if transponder 2 is in fact located in the active range of base station 1 and response signals transmitted by LF-transrmitter 3 are also received by base station 1.

The LF-response signal received by base station 1 contains an identification code. This code is received in the processor unit, and associated with base station 1 and checked for its validity. If it was possible to clearly decode the received transponder data and to thus identify the transponder, a receive confirmation signal is transmitted by base station 1 to transponder 2. The receive confirmation signal represents an acknowledgment signal, by which transponder 2 is notified that its response signal has been received, properly decoded, and that a transponder identification has taken place. If it was not possible to decode the transponder data (response signal), base station 1 repeats the prompting call until valid data is received from transponder 2. In addition, base station 1 will only then transmit the respective receive confirmation signal. If transponder 2 has received the receive confirmation signal, it switches off until it enters again in the detection area of base station 1 or when another base station and is thus prompted again.

Since the communication between the base station and transponder 2 may be temporarily subjected to interference, transponder 2 repeats, upon reception of the prompting signal, its response signal according to a predetermined number (n-times). In this case, the connection is adjustable for that the number of response signal repetitions Upon expiration of the response signal repetitions, no "receive" confirmation signal has been received from transponder 2, when the transponder transmits a response signal for the last time at (n+1)-times. If no "receive" confirmation signal is received by the transponder from base station 1 even in response to the response signal, transponder 2 switches to faulty operation. In this case, the transponder transmits a special alarm signal. This alarm signal may be designed, as a continuous signal. Instead of, or together with the transmission of an alarm signal, transponder 2 may also generate a visual or sound alarm.

The alarm signal transmitted by transponder 2 may not be received in case LF-receiver 3 or the alarm signal receiver of base station 1 is manipulatively blocked by an interfering transmitter. It is possible to position an additional alarm signal receiver 7, outside of the active range of base station 1. Transponder 2 sends the alarm signal to receiver 7, causing the latter to trigger a system alarm.

Such a system is largely secured against manipulation or tampering because the selected low frequency (LF) cannot be readily screened off. This security is increased in that with bidirectional communication between base station 1 and transponder 2, there are check mechanisms in which the alarm is triggered when defined criteria are not satisfied.

Figure 3:
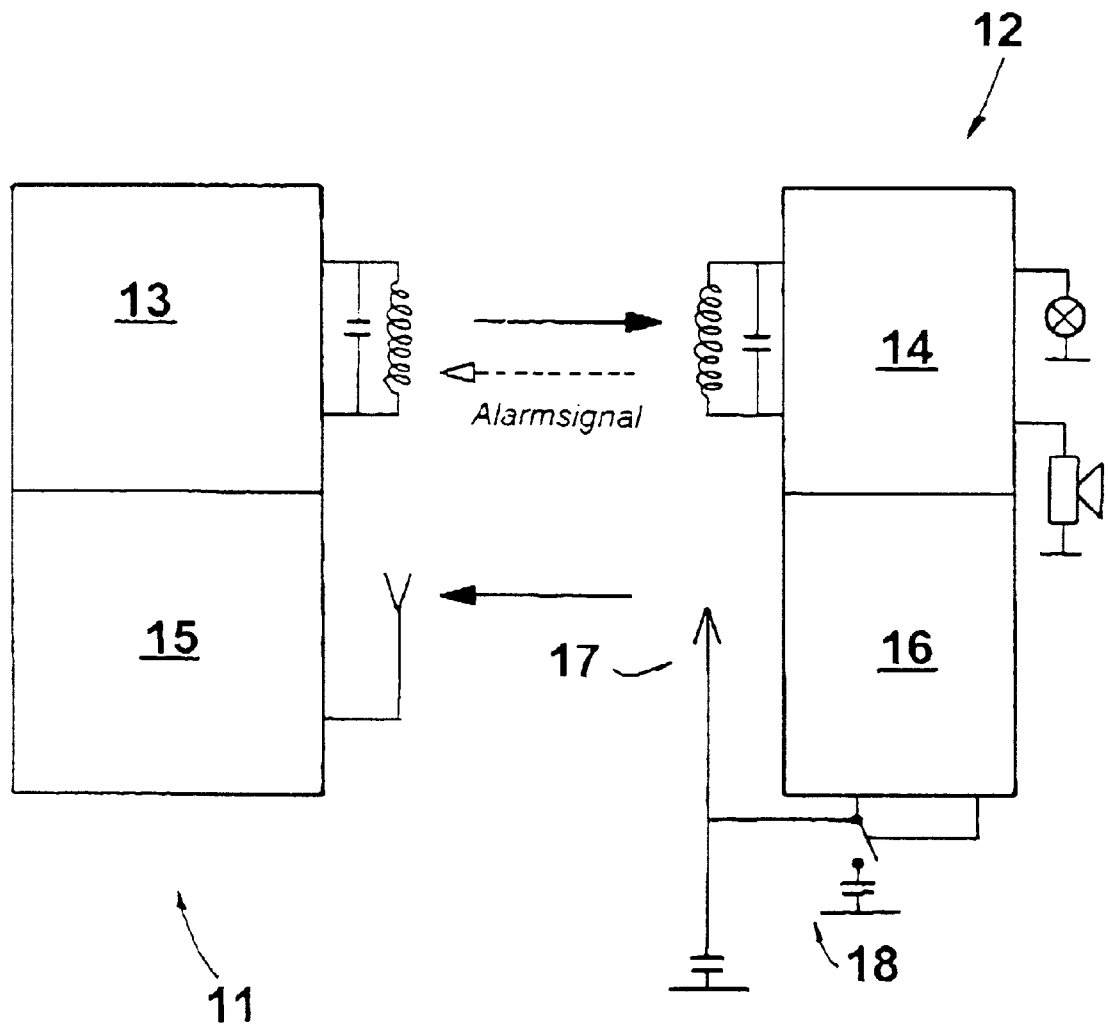
FIG. 3 is an electrical block diagram of the circuit of a second embodiment of the anti-theft security system for securing merchandise.

FIG. 3 shows an additional embodiment of the invention that comprises a base station 11 and another transmitter 12. Base station 11 contains LF-stage 13 and HF-stage 15. Transponder 12 contains LF-stage 14 and HF-stage 16. The HF-stage 16 of transponder 12 is designed in the form of a transmitter, and HF-stage 15 of base station 11 is designed as a receiver. Antenna 17 coupled to HF-stage 16, is connected to a mistuning circuit 18, by which antenna 17 can be mistuned with respect to its balancing. The anti-theft security system shown in FIG. 3 is applicable when the data transmitted in the response signal is so extensive that data transmission on the LF-line would take too long. When using an anti-collision process it is therefore useful to provide HF-stage 15 and, a HF-stage 16.

Figure 4:
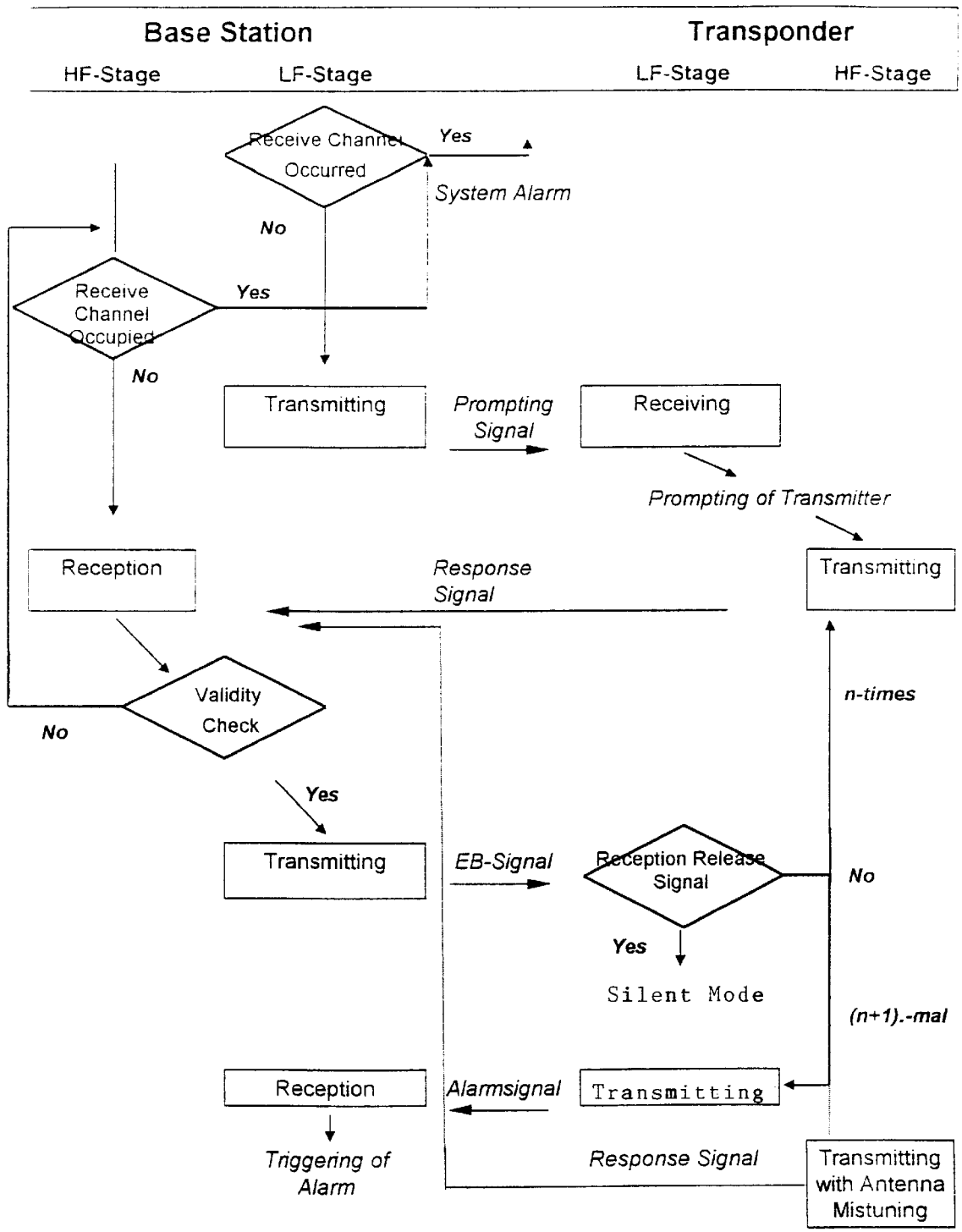
FIG. 4 is a schematic flow diagram for the detection and identification of a merchandise security label by a base station according to the embodiment of FIG. 3.

The process for the anti-theft security shown in FIG. 4 as compared to the operation in FIG. 2 comprises an occupancy check of base station 11 HF-receive channel 15 in addition to checking the occupancy of LF-receive channel 13. This step occurs after transponder 12 has been prompted several times via the transponder's LF-stage 14. The response signal has been unsuccessfully transmitted on the HF-line and thus if it does not receive a receiver confirmation signal, it switches to a faulty or alarm operation that also involves this transponder 12. This faulty or alarm operation can be designed in accordance with the embodiment shown in FIG. 1

If the response signal transmitted by HF-stage 16 is not received by base station 1, then this could be due to the security label, or, transponder 12 being manipulated or tampered with by screening it. This ensures the mistuning of antenna 17 with the help of mistuning circuit 18, which eliminates the effect on HF-antenna 17 by external screens to the greatest possible extent, or at least minimizes such an effect. In addition, with a disturbed or faulty operation of transponder 12, HF-transmitter 16 toggles back and forth between the two operating stages. This first operating stage is a response signal without antenna mistuning, while the second operating stage is a response signal with antenna mistuning. These therefore overcome these manipulation or tampering measures. In this connection, the transponder can be switched also to the aforementioned toggle operation by receiving a respective control signal on the LF-line from base station 1.

Figure 5:
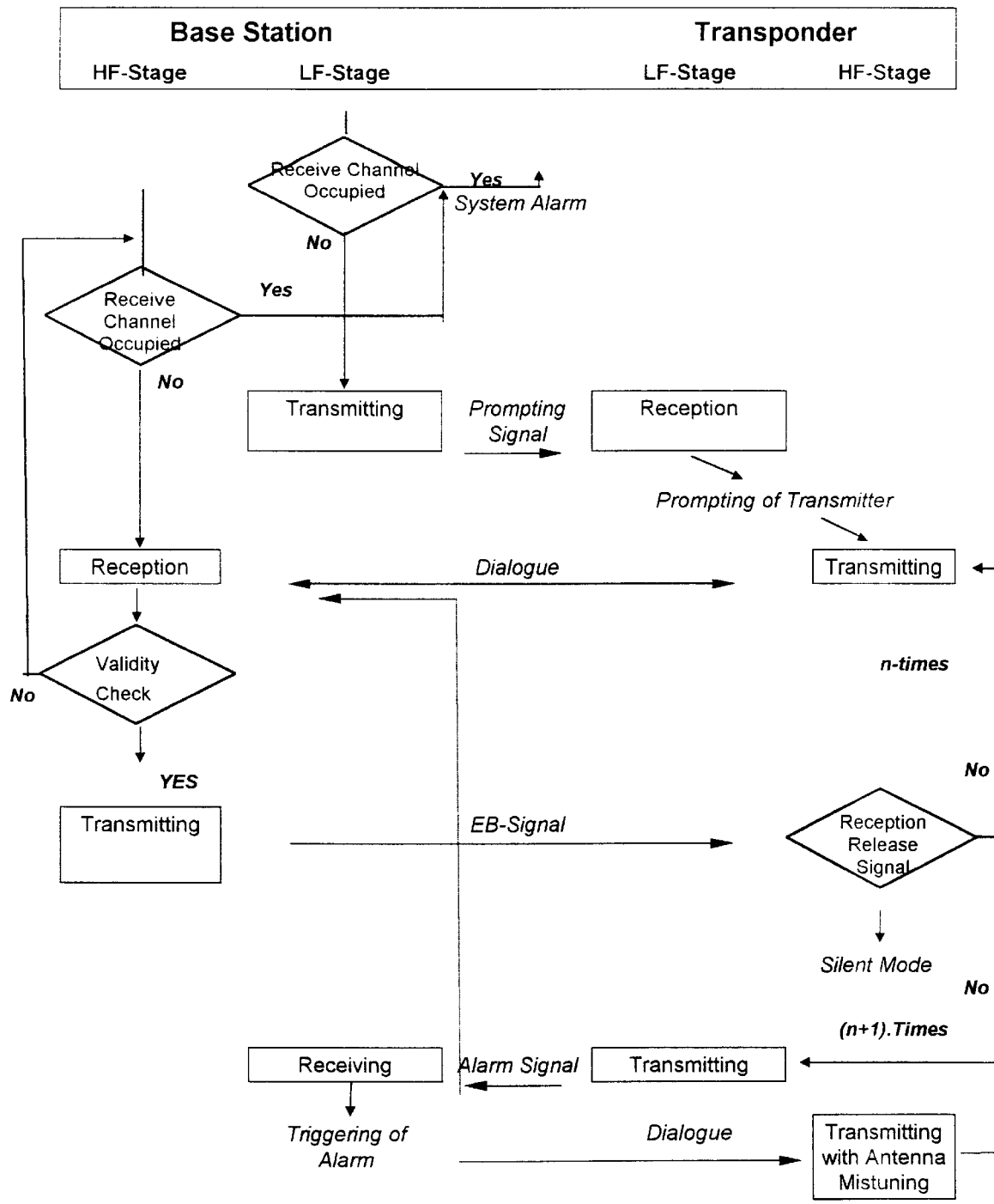
FIG. 5 is a schematic flow diagram for the detection and identification of a merchandise security label by a base station of yet another exemplified embodiment of the invention.

FIG. 5 shows a schematic version of the operation of another anti-theft security system in which both the base station and the transponder have a complete HF-stage as a transmitting-and-receiving unit in addition to a complete LF-stage. In the operation of this system, a bidirectional dialogue can take place between the base station and the transponder on the HF-line. This design is particularly suitable if an increased data exchange has to take place between the two modules. This increased data exchange could be used to carry out an authentication against listening-in on the RF radio line to protect the data to be exchanged with pass words, or to transmit such data encoded. With bidirectional data traffic on the HF-line, it is much safer to detect possible manipulations triggered by screens or by external or interfering transmitters. Furthermore, since a bidirectional LF-line is available, the alarm mode can be optimally initiated also by the base station. It has to be assumed in this connection that the transmitting power of the base station is significantly higher on the LF-line, and will thus also penetrate LF-conditioned The possibility of bidirectional data transmission, furthermore, the permits detection of merchandise classification data in addition to identification data. This classification data is transmittable from the base station, for example to a merchandise management system. The present system is therefore suitable also for controlling machine or tool bin pools, from which equipment can be removed only by authorized personnel. Any unauthorized removal of equipment is made substantially more difficult when such a system is employed.

Accordingly, while a few embodiments of the present invention have been shown and described, it is to be understood that many changes and modifications may be made thereunto without departing from the spirit and scope of the invention as defined in the appended claims.

What is claimed is:

1. An anti-theft security system for securing merchandise comprising:
    a base station having a low frequency (LF) stage with a LF transmitting and receiving unit;
    an antenna attached to said base station said antenna for generating an electromagnetic field;
    a plurality of security labels for attachment to merchandise each having an active transponder, wherein each transponder comprises a LF stage having a LF transmitter and receiving unit operating on the same frequency as said base station LF stage, so that in response to a LF signal from said base station, a bidirectional signal transmission takes place between the base station and at least one of the security label transponders; and an antenna disposed on said transponder's LF-transmitting-and-receiving unit, wherein said antenna serves for both signal reception and transmission;

a HF-transmitter for operating at high frequency and associated with said at least one security label transponder, which HF transmitter is prompted by said LF-transmitting and receiving unit; and a HF-receiving unit associated with said base station operating on the same frequency as said HF-transmitter of said transponder.

2. The anti-theft security system according to claim 1, wherein said transponder antenna comprises a mistuning device and wherein the HF-transmitter of the transponder is connected to said antenna mistuning device.

3. Anti-theft security system according to claim 1, wherein the base station and the transponder each comprise a HF-receiving-and-transmitting unit.

4. The anti-theft security device according to claim 1, wherein said LF-receiver of the LF stage is designed as an alarm receiver for receiving an alarm signal transmitted by said transponder.

5. The anti-theft security system according to claim 1, further comprising an additional alarm receiver attached to said base station wherein the receiving range of said alarm receiver is arranged outside the active range of the base station.

6. A process for the automatic detection and identification of a merchandise security label by a base station comprising the steps of:

transmitting a low-frequency control signal by a LF-stage of the base station;

receiving the control signal by a LF-stage of a transponder attached to a merchandise security label;

transmitting a response signal by a transmitter attached to said transponder;

receiving the transponder response signal by a receiving unit of said base station operating on the same frequency;

transmitting a receive confirmation signal by said base station; and receiving the receive confirmation signal by said transponder;

wherein, if a non-release signal is received by said transponder, or if no receive confirmation signal is received after the response signal has been repeatedly transmitted, and said transponder triggers an alarm on the LF-line, and prior to or in the course of signal transmission, said base station performs an occupancy check with respect to the external occupancy of the line used for receiving the response signal, and an occupancy message is issued if an external occupancy is detected.

7. The process according to claim 6, wherein the response signal of said transponder is transmitted by said LF-stage associated with said transponder.

8. The process according to claim 6, wherein the response signal of said transponder is transmitted by its HF-stage and the process further comprises the step of carrying out an occupancy check by said base station with respect to external occupancy of the used lines during or prior to said signal transmission wherein said occupancy message is issued by at least one of the two lines which are found to be occupied externally.

9. The process according to claim 8, wherein a bidirectional dialogue between said base station and said transponder takes place on the HF-line.

10. The process according to claim 8, wherein if the reception of an HF-response signal of the transponder receives interference, said base station LF-stage transmits a control signal switching the transponder to toggle operation.

11. The method according to claim 7, further comprising the step of mistuning the transponder's HF-antenna if a confirmation signal is not received from the LF-stage of said transponder.

12. The process according to claim 6, wherein an encoded prompting signal is used as the control signal to be transmitted by said base station.

13. The process according to claim 6, wherein the process is carried out with a multitude of transponders, whereby an anti-collision check is additionally carried out with respect to the receiving readiness of the stage of said base station receiving the response signals.

14. The process according to claim 6, wherein said base station transmits a cyclical control signal on the LF-line and that an alarm signal, transmitted by a transponder is received by an alarm signal receiver, said receiver being anti-cyclically synchronized with respect to the transmission of the control signal, so that an alarm signal can be received if the base station is in the non-transmitting mode in transmitting a control signal.

15. The process according to claim 14, wherein the input circuit of the alarm signal receiver is switched silent via attenuators for the duration of the control signal of said base station.

16. The process according to claim 6, wherein the prompting or control signal transmitted by said base station is used as a synchronizing signal for synchronizing the transmission of an alarm signal transmitted by a transponder in time, and that the data content of the transmitted alarm signal of the transponders comprises the same data.

17. The process according to claim 8, further comprising the step of transmitting an alarm signal from said transponder by repeatedly reversing the transmission alternating between the LF-line and the HF-line.

18. A process for the automatic detection and identification of a merchandise security label by a base station comprising the steps of:

transmitting a low-frequency control signal by a LF-stage of the base station;

receiving the control signal by a LF-stage of an active transponder attached to a merchandise security label;

transmitting a response signal by a transmitter attached to said transponder;

receiving the transponder response signal by a receiving unit of said base station operating on the same frequency;

transmitting a receive confirmation signal by said base station; and receiving the receive confirmation signal by said transponder;

wherein, if a non-release signal is received by said transponder, or if no receive confirmation signal is received after the response signal has been repeatedly transmitted, and said transponder triggers an alarm on the LF-line, and prior to or in the course of signal transmission, said base station performs an occupancy check with respect to the external occupancy of the line used for receiving the response signal, and an occupancy message is issued if an external occupancy is detected, and wherein said control signal is a prompting signal, so that when said LF-receiver receives the signal, it prompts the transmitter of said transponder.

* * * * *